May 16, 1933. M. A. LISSMAN 1,909,184
CENTRIFUGAL SEPARATOR
Filed Dec. 8, 1930 5 Sheets-Sheet 1

INVENTOR.
Marcel A. Lissman.
BY Arthur P. Knight &
Alfred W. Knight
ATTORNEYS.

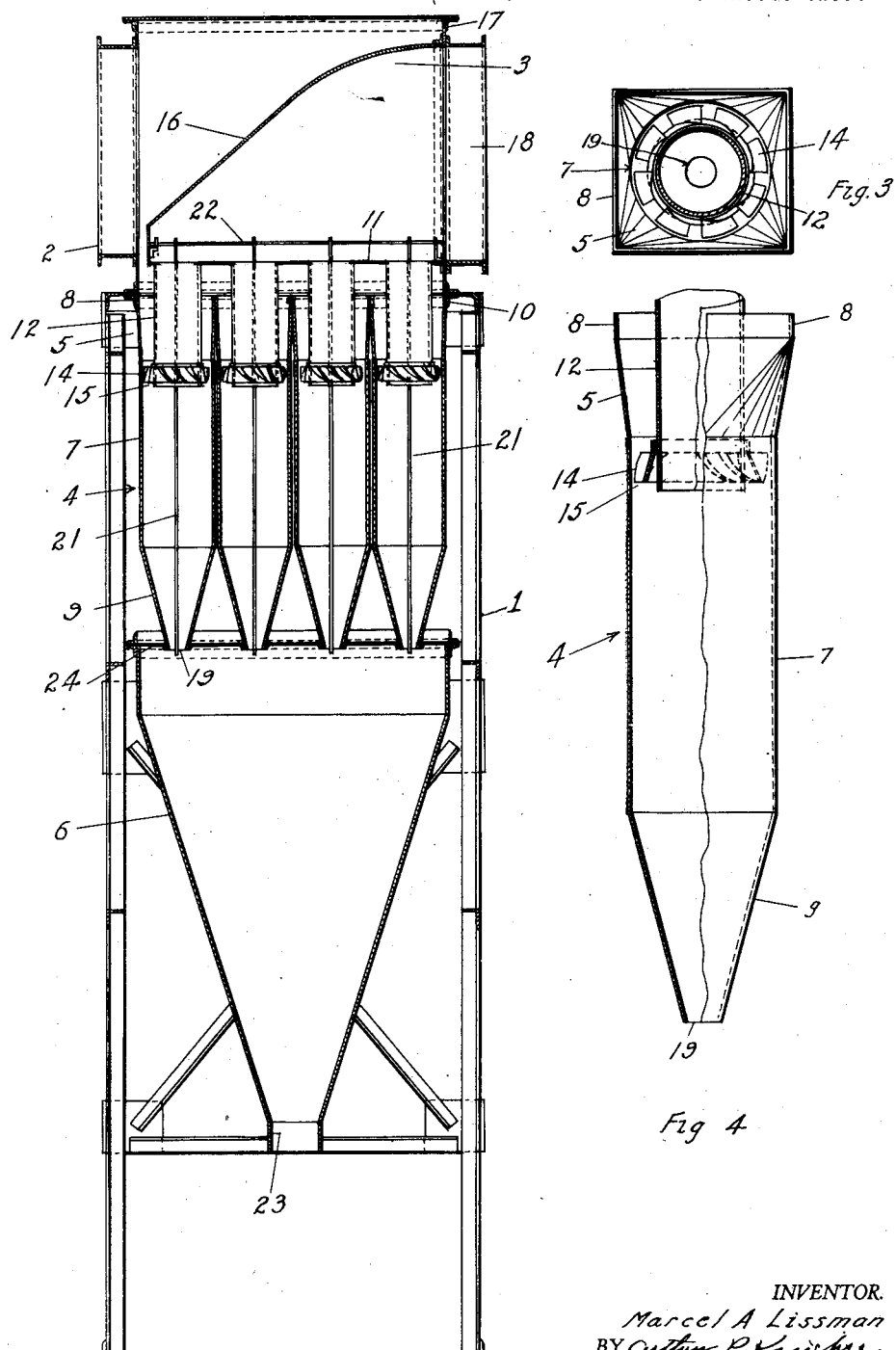

May 16, 1933.  M. A. LISSMAN  1,909,184
CENTRIFUGAL SEPARATOR
Filed Dec. 8, 1930   5 Sheets-Sheet 3

INVENTOR.
Marcel A. Lissman.
BY
ATTORNEYS.

May 16, 1933.　　M. A. LISSMAN　　1,909,184
CENTRIFUGAL SEPARATOR
Filed Dec. 8, 1930　　5 Sheets-Sheet 5

INVENTOR.
Marcel A. Lissman.
BY
ATTORNEYS.

Patented May 16, 1933

1,909,184

UNITED STATES PATENT OFFICE

MARCEL A. LISSMAN, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA

CENTRIFUGAL SEPARATOR

Application filed December 8, 1930. Serial No. 500,753.

This invention relates to apparatus for separation of suspended material from gases by centrifugal action, and the main object of the invention is to provide a construction for this purpose which will operate at high efficiency and will be of low cost. A further object of the invention is to provide in connection with said centrifugal separating apparatus, means for preventing the same being clogged by separated material.

Another object of the invention is to provide in connection with centrifugal separating apparatus comprising a plurality of centrifugal separating units assembled in compact arrangement, means for preventing accumulation of dust or other solid material upon or within such units or upon or within the connections thereof.

The accompanying drawings illustrate an embodiment of my invention and referring thereto:

Fig 2 is a section on line 2—2 in Fig. 1.

Fig. 3 is a plan view, and Fig. 4 a side elevation partly in section of one of the separating units.

Figure 1:
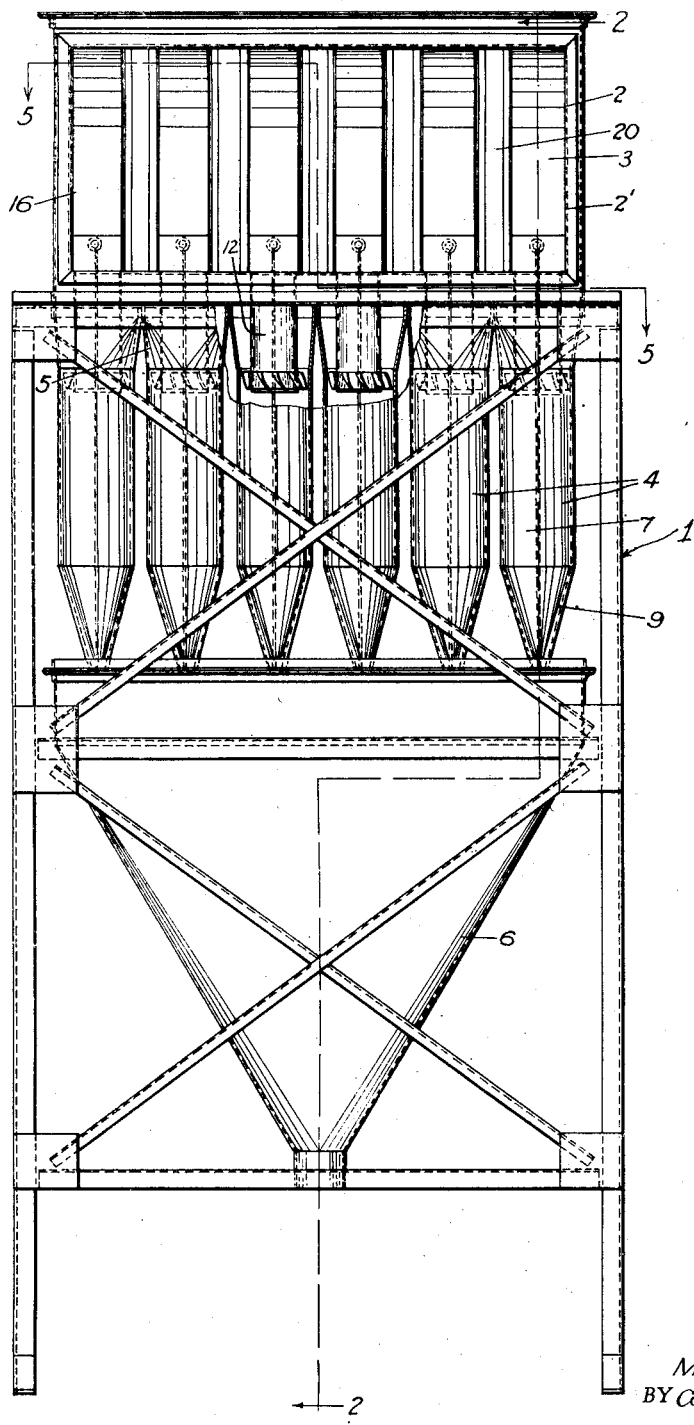
Fig. 1 is a front elevation of the apparatus partly in section.
Figure 5:
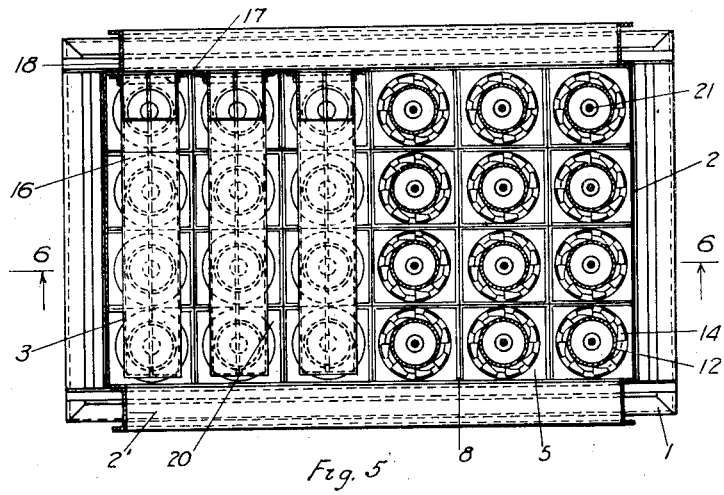
Fig. 5 is a section on line 5—5 in Fig. 1.
Figure 6:
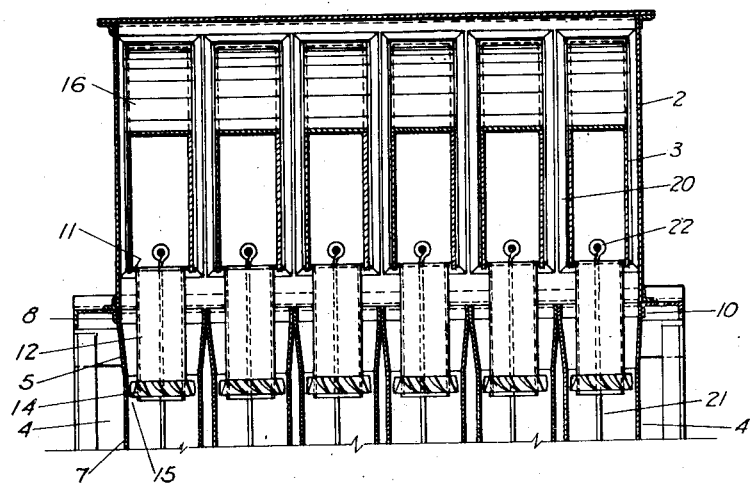
Fig. 6 is a section on line 6—6 in Fig 5.

The apparatus constituting my present invention may be mounted in a suitable frame 1 and may comprise an inlet header 2, outlet header means 3, a plurality of separator units 4 connected to receive gas from the inlet header and to discharge the clean gas to said outlet header means, and a receptacle 6 for receiving separated material from the said separator units.

The inlet header 2 may be formed as a rectangular structure of sheet metal or other suitable material, mounted on top of the frame 1. Said header is provided with an inlet opening 2' which may, for example, be located at one side thereof, as shown. The respective separator units 4 are preferably formed as tubular members having cylindrical body portions 7 of circular cross-section expanded at their upper ends as shown at 5 to form squared or rectangular portions 8 and tapered at their lower ends to form outlet cones 9. In assembling the said units their squared upper end portions 8 are arranged contiguously and are electrically welded or otherwise fastened together so as to unite all of the separator units at their upper ends, and the block of separator units thus formed is secured on the frame 1, being for example mounted and secured within a rectangular frame portion 10 at the top of frame 1 so that the open upper ends of the respective separator units are in communication with the inlet header 2, said open upper ends all lying in a single horizontal plane at the bottom of said inlet header. With such a construction there are no ledges or horizontal surfaces of any considerable area which would be liable to collect suspended material, it being understood that the separator units 4 are formed of comparatively thin sheet metal and the upper edge portions 8 thereof present negligible horizontal surfaces. This feature of my invention is of special importance where it is desired to separate combustible material, for example coal dust, flour or the like from gases carrying the same, as it minimizes the danger of explosion or fire due to collection of such material within the apparatus.

The separator units 4 are preferably arranged in a plurality of rows extending side by side and the outlet header means 3 preferably consists of a plurality of chambers, there being one outlet chamber for each such row of separator units and these chambers 3 being spaced apart so as to provide spaces 20 therebetween permitting free passage of the gas to the inlet openings of the separator units. From the bottom plate 11 of each outlet chamber 3 extend a plurality of outlet tubes 12, each opening at its upper end through said bottom plate into the outlet chamber 3, and each extending downwardly within a corresponding separator unit 4 and opening at its lower end into the interior of said separator unit, preferably at about the upper end of the cylindrical portion 7 of said separator unit. A series of vanes or blades 14 is provided around each outlet tube 12, said vanes or blades being inclined helically and being arranged within an annular inlet passage 15 extending between the upper portion of the cylindrical member 7 and the lower portion of the outlet tube 12, so as to cause the gas passing through said inlet passage to be deflected spirally and to be given a tangential component of motion as hereinafter described.

The deflector vanes 14 are preferably secured to the respective outlet tubes 12 and extend into contact with the cylindrical members 7 so as to properly center the tubes 12 in members 7.

In order to minimize turbulence and facilitate entry of the gas from the entrance of the inlet header to the inlet openings at the upper ends of the separator units, each outlet header chamber 3 is preferably formed with an inclined top as shown at 16 extending upwardly and forwardly toward the outlet end of said header chamber. At said outlet the several header chambers 3 are secured to a plate 17 to which may also be secured an outlet flue 18 which receives the gas from the plurality of header chambers 3, said plate 17 having openings registering with the respective outlet headers, so that all of the header chambers discharge into the flue 18.

In some cases it is desirable to provide means for mechanical scraping or agitation, so as to prevent accumulation of suspended material within the separator units and particularly at the contracted outlets 19 thereof at the bottom of the outlet cones 9. For this purpose suitable members such as chains or rods 21 may be provided, supported at their upper ends on suitable supports 22 and hanging from said supports so as to extend centrally within the respective separator units 4 and through the restricted outlets 19 at the lower end thereof, these cleaning members being adapted to be operated by the action of the gas current as hereinafter described.

The receptacle 6 for separated material may consist of a hopper or cone mounted on the frame 1 below the block of separator units and provided with a top plate 24 formed with openings which fit around the conical outlet members 9 of the separator units. Said receptacle 6 is provided at its bottom with a discharge opening 23 through which the separated material may be removed continuously or from time to time under the control of any suitable gate or conveyor means.

I prefer to make the centrifugal separator units 4 of considerable vertical height and of relatively small diameter, said units being for example from 4 to 12 inches in diameter and the height of the cylindrical portions thereof being preferably at least three or four times the diameter thereof. I also prefer to make the constricted outlet 19 at the bottom of each centrifugal element or unit comparatively small relative to the diameter of such unit, and preferably not greater than one-fourth the diameter of such unit.

The operation of the apparatus above described is as follows. The air or gas to be treated, which is assumed to contain dust, fume or other suspended solid or liquid material, is supplied through any suitable inlet flue to the inlet header 2 and passes downward through the spaces 20 between the several outlet header portions 3 to the respective inlets at the upper ends of the separator units 4, being conducted from such inlet openings downwardly through the annular inlet passages between the expanded portions 5 and the outlet tubes 12. From the lower end of the expanded portion of each separator unit, the gas passes into the upper end of the cylindrical portion 7 of such unit and between such upper portion and the lower end portion of the outlet tube 12, and at this point the gas is subjected to the action of the vanes 14 which deflect the gas so as to impart a swirling or vortical motion thereto so that as the gas passes downwardly in the tubular member 4 it has a tangential as well as a vertical component of motion. This results in a pressure head representing an excess of pressure at the peripheral portion or zone of the vortically moving body of gas and a deficiency of pressure in the central portion or core of such body. As the gas descends in the cylindrical portion 7, the tangential velocity is gradually decreased by reason of the friction against the wall of the separator unit so that when the gas reaches the tapered outlet cone at the bottom of the cylindrical portion 7 the radial pressure head thereon is sufficiently decreased to enable the longitudinal pressure head originally imposed upon the gas to force the gas inwardly as it descends in the outlet cone. The proportions of the parts are preferably such that the pressure at the periphery of the outlet opening 19 is somewhat greater than the pressure at the outlet tube 12, so that there is a positive ejecting action on the suspended particles at the peripheral portion of the outlet opening, it being understood that due to the vortical motion the suspended particles being heavier than the gas are thrown outwardly into the peripheral zone adjacent the wall of the separating unit and descends along or adjacent such wall until they reach the outlet opening. Concurrently with the above described operation, there is an inward flow of relatively clean gas toward the center of the separating unit and upwardly to the outlet opening 12, and the streams of relatively clean gas passing upwardly through the several outlet openings 12 are collected in the corresponding header portions 3 and eventually delivered to the outlet flue 18 or if so desired to the outer air.

In case the material being treated is such as to tend to accumulate in or adhere to the wall of the separator units and particularly the constricted outlet openings thereof, the cleaning devices 21 above described are provided, said devices consisting of rods or chains being set in motion by the rapidly moving current of gas, such motion consisting generally of revolution of the cleaning member around a vertical axis passing through its point of suspension by the action thereon of the vortically moving current of gas. If chains are used as cleaning members the vortical motion may be sufficient to cause the chains to bend laterally to contact with the walls of the conical portion 9 and possibly also the cylindrical portion 7 of each separator unit to effectively clean the same. If rods are used as cleaning members, the cleaning action of the rods will generally be limited to the vicinity of the outlet openings for the respective separator units, the rods preferably extending through said outlet openings as shown and being formed with eyes at their upper ends which engage the support 22 to movably mount the rods on said support so that the rods may swing laterally sufficiently to enable their lower ends to engage the walls of the outlet openings.

It will be noted that with the above described construction there are no extended horizontal surfaces on which suspended solid material can collect or be deposited from the gas stream in passing into and through the apparatus. The only horizontal surfaces present are at the bottom of the outlet header members 3 and inasmuch as the gas present in this portion of the apparatus is substantially clean, the liability of deposition of solid material on such surfaces is minimized. The stated construction, which is adapted to prevent accumulation of solid material within the separator, is of special advantage in cleaning gases containing combustible material such as coal dust or the like, which is liable to lead to destructive explosion if it accumulates in any considerable quantity.

Figure 7:
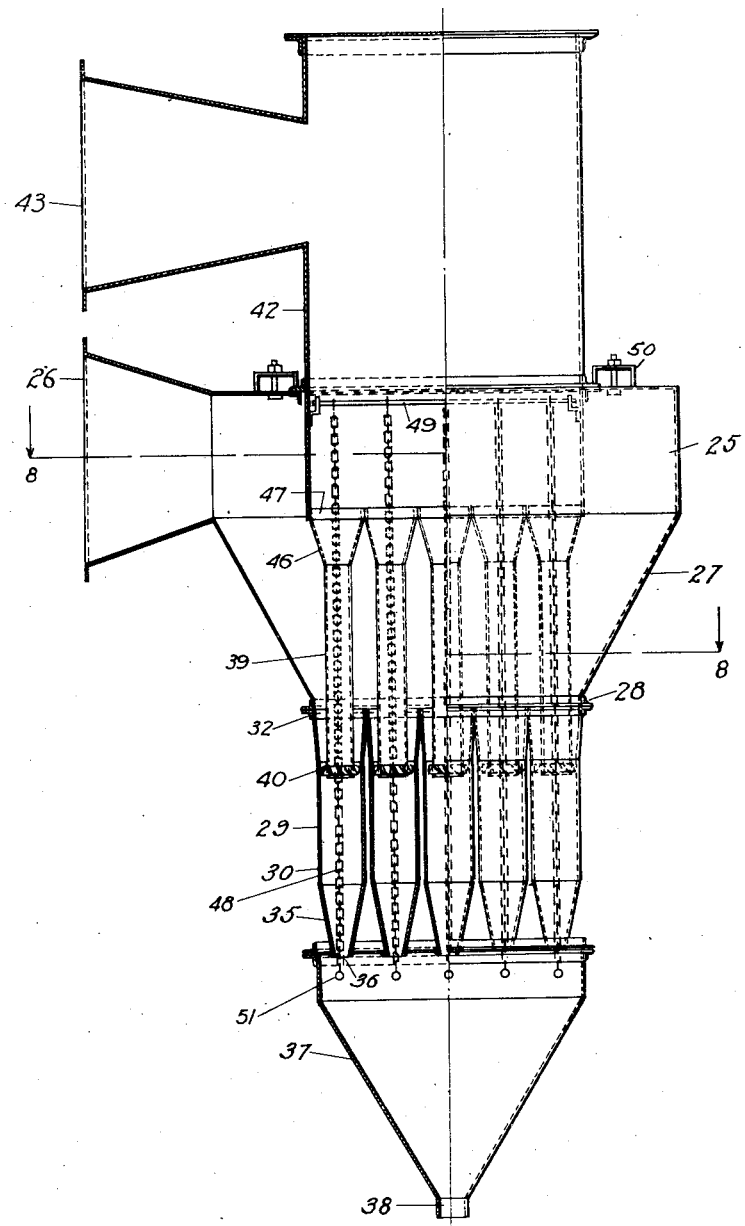
Fig. 7 is a partly sectional side elevation of a modification.
Figure 8:
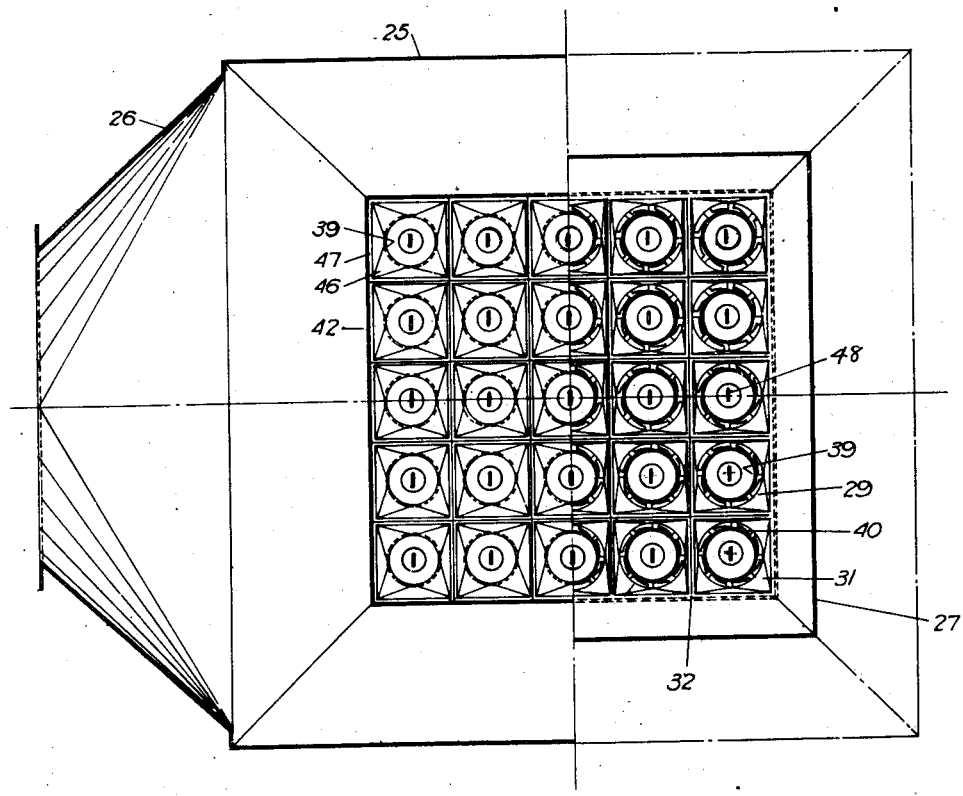
Fig. 8 is a section on line 8—8 in Fig. 7.

In some cases, as in the treatment of gases containing combustible material which is so difficultly separable as to involve the presence of a considerable amount of such suspended material in the gases leaving the apparatus, I may adopt the construction shown in Figs. 7 and 8, comprising a horizontal inlet header 25 having an inlet opening 26 and having a hopper-shaped downward extension 27 formed at its bottom with a rectangular frame 28 within which is mounted a block of separator units 29 similar to those described, being for example mounted in a plurality of rows extending side by side and united at their upper ends. Said separator units 29 may comprise tubular portions 30 and expanded upper end portions 31, serving as transformers between the cylindrical portions 30 and the squared or rectangular upper end portions 32 of the respective separator units, said squared portions of the separator units being arranged in contiguous relation and electrically welded or otherwise secured together as above described. The lower ends of the respective cylindrical portions 30 terminate in tapering portions 35 leading to outlet openings 36 for the suspended material, said outlet openings discharging into a hopper or receptacle 37 provided with discharge opening 38.

Gas outlet tubes 39 extend within the respective separator units as above described, being provided with helical deflector vanes 40 at their lower ends, and said outlet tubes being mounted on and extending downwardly from an outlet header 42 which may open to the outer air or may be provided with means 43 for connection to an outlet flue. The outlet header 42 extends downwardly within the inlet header 25 and at its lower end is connected to the block of outlet tubes 39, said upper end portions being expanded as shown at 46 so as to connect the cylindrical tubes 39 with the squared or rectangular upper end portions 47, said squared upper end portions being placed in contiguous relation and electrically welded or otherwise secured together to form a block of outlet elements which are secured within the lower end of the outlet header. The upper header, with the outlet tubes mounted thereon may be removed bodily from the inlet header and the block of tubular separator units, said outlet upper header being secured to the inlet header by releasable clamp means 50.

In connection with this form of my invention I have shown chains 48 hung from suitable supports 49 in the outlet header and extending down through the centrifugal separator units to clean the same as above described. In case chains are used as cleaning elements they are preferably provided with weights as shown at 51 at their lower ends, to properly control their movement.

In this form of my invention, the outlet header as well as the inlet header and the separator units is free from any horizontal surfaces which would be liable to collect solid suspended material and a further safeguard against explosion is thereby provided. In other respects the operation of the invention is the same as that above described.

Figure 9:
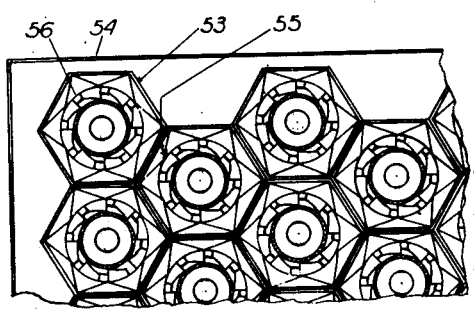
Fig. 9 is a partial horizontal section of a modified form of the assemblage of separator units.

While the substantially square construction of the upper ends of the separator units is desirable as providing the most compact arrangement, it may be desirable in some cases to make these portions of the separator units of rectangular shape other than square, for example, with the dimensions transverse to the rows of separator units greater than the dimension longitudinally of such rows, so as to provide for more space for entrance of the gases between the outlet headers. Furthermore, the invention includes the use of other polygonal shapes for these parts, it being understood that the upper ends of the separator units may be formed in the shape of polygons adapted to fit one another in compact arrangement, for example, in squares, rectangles, or hexagons. Thus, in Fig. 9 there is shown a construction in which the separator units are formed of hexagonal upper end portions 53 fitting one another in compact arrangement and secured by welding or otherwise so as to form a compact block of separator units, a suitable header 54 being connected to the block of hexagonal members to support the same and conduct the gas thereto or therefrom as the case may be, it being understood that this hexagonal construction may be applied to either or both of the inlet or outlet headers. The construction of the tubular body 55 of the separator members may be the same as above described, such tubular body being in any case connected to the polygonal upper end portion of the separator unit by the expanded portion indicated at 56.

I claim:

1. A centrifugal separator comprising a plurality of rows of separator units, each separator unit having a tubular body portion of circular cross-section and an upper end portion of polygonal cross-section and having an expanded portion uniting said portions of circular and polygonal cross-section, said polygonal portions of the respective separator units being placed in contiguous relation and secured together, gas outlet tubes extending within the respective separator units, deflector vanes mounted between said gas outlet tubes and the said tubular body portions of the separator units and inclined so as to produce a vortical motion in the gases entering the separator units, and inlet header means connected to the separator units and opening into the polygonal upper ends of said separator units.

2. A centrifugal separator comprising a plurality of rows of separator units, each separator unit having a tubular body portion of circular cross-section and an upper end portion of polygonal cross-section and having an expanded portion uniting said portion of circular and polygonal cross-section, said square portions of the respective separator units being placed in contiguous relation and secured together, gas outlet tubes extending within the respective separator units, deflector vanes mounted between said gas outlet tubes and the said tubular body portions of the separator units and inclined so as to produce a vortical motion in the gases entering the separator units, inlet header means connected to the separator units and opening into the rectangular upper ends of said separator units, and outlet header means communicating with said outlet tubes.

3. A construction as set forth in claim 2, in which said outlet header means comprises a plurality of header chambers one extending over each row of separator units and communicating with the outlet tubes thereof, said header chambers each extending within the inlet header and being spaced apart to permit entry of gas from said inlet header through the spaces therebetween to the inlet openings at the upper ends of the separator units of the respective rows.

4. A construction as set forth in claim 2, in which said outlet header means comprises a plurality of header chambers one extending over each row of separator units and communicating with the outlet tubes thereof, said header chambers each extending within the inlet header and being spaced apart to permit entry of gas from said inlet header through the spaces therebetween to the inlet openings at the upper ends of the separator units of the respective rows, and the tops of said header chambers being inclined upwardly toward the outlet end thereof.

5. A construction as set forth in claim 2, in which said outlet tubes are formed with rectangular upper end portions and with expanded portions connecting said rectangular upper end portions with the lower portions of said outlet tubes, said rectangular upper end portions being arranged in contiguous relation and being secured together, and the outlet header means being connected to and communicating with the rectangular upper end portions of the upper ends of said outlet tubes.

6. In a centrifugal separating apparatus, a vertical tubular separating chamber provided with inlet means and with means for directing gas passing through the inlet means into said chamber to produce a vortical motion of the gas within the separating chamber, said separating chamber having a constricted opening at its lower end, gas outlet means located within the upper portion of the separating chamber, a supporting member extending above the separating chamber, and cleaning means consisting of a member mounted on said supporting member and extending within the chamber and within the constricted opening at the bottom thereof, said cleaning means being movable by the action of the movement of the gas within the chamber unit so as to effect cleaning of the restricted outlet at the bottom of said unit.

7. A construction as set forth in claim 6, in which said cleaning means consists of a rod movably mounted at its upper end on said supporting member so as to provide for lateral movement of said rod.

8. A construction as set forth in claim 6, in which said cleaning means consists of a chain suspended from said support.

9. In a centrifugal separating apparatus, an inlet header, a plurality of tubular separating elements connected to said inlet header and opening into the same at their upper ends, outlet pipes extending centrally within the upper portions of the respective tubular elements and also extending upwardly within said inlet header but free from direct communication therewith, said outlet pipes opening at their lower ends into the interiors of said tubular elements and defining annular inlet passages between said outlet pipes and the tubular elements, and a plurality of helically inclined vanes mounted within each of said annular inlet passages.

10. In a centrifugal separating apparatus, an inlet header, a plurality of tubular separating elements connected to said inlet header and opening into the same at their upper ends, outlet pipes extending centrally within the upper portions of the respective tubular elements and also extending within said inlet header, said outlet pipes opening at their lower ends into the interiors of said tubular elements and defining annular inlet passages between said pipes and the tubular elements, a plurality of helically inclined vanes mounted within each of said annular inlet passages, and outlet header means connected to the upper ends of said outlet pipes.

11. In a centrifugal separating apparatus, a construction as set forth in claim 10, said tubular elements being arranged in a plurality of rows, and said outlet header means comprising a plurality of separate outlet chambers each extending above one of said rows and connected to the outlet pipes of that row, said outlet chambers extending within said inlet header and being spaced apart to provide passages therebetween for inflow of gas from the inlet header to the upper ends of the tubular elements.

12. In a centrifugal separating apparatus a plurality of tubular separator members, inlet header means extending above said separator members and communicating with the upper ends thereof, outlet header means removably mounted on said inlet header means, a plurality of outlet tubes mounted on said outlet header means and extending downwardly therefrom and into the upper portions of said tubular separating members, and helically arranged vanes mounted on the lower end portions of said outlet tubes.

In testimony whereof I have hereunto subscribed my name this 2nd day of December, 1930.

MARCEL A. LISSMAN.